United States Patent
Uchida (10) Patent No.: US 8,848,276 B2
(45) Date of Patent: Sep. 30, 2014

(54) OPTICAL-PATH CONVERSION DEVICE AND IMAGING APPARATUS

(75) Inventor: Shinji Uchida, Osaka (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 13/805,432

(22) PCT Filed: Jul. 6, 2011

(86) PCT No.: PCT/JP2011/003858
§ 371 (c)(1),
(2), (4) Date: Dec. 19, 2012

(87) PCT Pub. No.: WO2012/004988
PCT Pub. Date: Jan. 12, 2012

(65) Prior Publication Data
US 2013/0088767 A1    Apr. 11, 2013

(30) Foreign Application Priority Data

Jul. 9, 2010   (JP) ................................ 2010-156943

(51) Int. Cl.
*G02F 1/01*       (2006.01)
*G02B 13/00*    (2006.01)
*G02B 27/46*    (2006.01)
*G02B 26/06*    (2006.01)

(52) U.S. Cl.
CPC ............ *G02B 26/06* (2013.01); *G02B 13/0075* (2013.01); *G02B 27/46* (2013.01); *G02B 13/004* (2013.01)
USPC ............................................. 359/279; 359/22

(58) Field of Classification Search
CPC .. G02B 13/004; G02B 13/0075; G02B 26/06; G02B 27/46
USPC ..................................................... 359/279, 22
See application file for complete search history.

(56) References Cited

U.S. PATENT DOCUMENTS 6,628,392 B2     9/2003  Kuroda et al.
8,107,145 B2 *   1/2012  Hara ................................ 359/22
2003/0128361 A1  7/2003  Kuroda et al.

FOREIGN PATENT DOCUMENTS

JP        61-138922       6/1986
JP        1-149610 U     10/1989
(Continued)

OTHER PUBLICATIONS

International Search Report issued Aug. 2, 2011 in corresponding International Application No. PCT/JP2011/003858.
(Continued)

*Primary Examiner* — Thomas K Pham
*Assistant Examiner* — Vipin Patel
(74) *Attorney, Agent, or Firm* — Wenderoth, Lind & Ponack, L.L.P.

(57) ABSTRACT

An optical-path conversion device includes: a plate-shaped phase modulation mask in which a plurality of phase modulation parts are discretely formed for providing phase modulation to light passing through, and a first light-transmission part is formed for transmitting the light; and a plate-shaped light-shielding member in which a plurality of light-shielding parts are discretely formed for blocking the light, and a second light-transmission part is formed for transmitting the light, in which the phase modulation mask and the light-shielding member overlap each other at least in part, when viewed in an incident direction of the light, and at least one of the phase modulation mask and the light-shielding member is movable in an intersection direction which intersects with the incident direction.

6 Claims, 5 Drawing Sheets

(56) References Cited

FOREIGN PATENT DOCUMENTS

| JP | 2000-98303 | 4/2000 |
|----|------------|--------|
| JP | 2000-160963 | 6/2000 |
| JP | 2002-40336 | 2/2002 |
| JP | 2002-62489 | 2/2002 |

OTHER PUBLICATIONS

Reply to the written opinion of the International Searching Authority issued Aug. 2, 2011 in corresponding International Application No. PCT/JP2011/003858 (with English translation).

* cited by examiner

OPTICAL-PATH CONVERSION DEVICE AND IMAGING APPARATUS

TECHNICAL FIELD

The present invention relates to an optical-path conversion device for varying an optical-path, and an imaging apparatus including the optical-path conversion device.

BACKGROUND ART

As an optical-path conversion device used for a conventional imaging apparatus, there have been proposed a phase modulation mask, a liquid-crystal varifocal lens, an optical lens, a prism, and the like.

The proposed optical-path conversion device includes (i) a device which varies an optical-path using an optical element having a geometrically unique shape (see Patent Literature (PTL) 1, for example), and (ii) a device which varies an optical-path by applying a voltage on an optical element so as to vary a refraction index (see PTL 2).

In PTL 1, a pair of phase modulation masks are used as the optical-path conversion device. One of the pair of the phase modulation masks is rotated with respect to the other one to cause the optical-path to be varied, thereby enlarge a depth of field of an optical system.

Specifically, each of the pair of the phase modulation masks is a member which has one surface having a plane shape and the other surface having a curved shape expressed by $z=kx^3$ (k is a constant). In addition, the pair of the phase modulation masks are arranged in such a manner that one is fixed and the other one is rotatable in a range within 90 degrees.

As a default position, the rotatable phase modulation mask is arranged so as to cancel phase modulation which occurs in the fixed phase modulation mask. At this time, the pair of the phase modulation masks substantially operates as plane plates parallel to each other, and provides no phase modulation to light passing the pair of the phase modulation masks.

Next, the rotatable phase modulation mask is rotated at 90 degrees. At this time, the pair of the phase modulation masks provide the phase modulation to the light passing therethrough. For example, the light which passes through the pair of the phase modulation masks is subjected to modulation in an X-direction and a Y-direction, so that the optical-path is two-dimensionally varied.

As described above, a relative positional relationship between the paired phase modulation masks is shifted at 90 degrees about an optical axis of an optical lens, so that the pair of the phase modulation masks can produce a modulation function similar to that produced by a cubic phase modulation mask. Here the modulation function is expressed by $z=k(x^3+y^3)$ (here, k is a constant). In this case, the light which has passed through the pair of the phase modulation masks is inflected and converted to a beneficial light flux, so that the pair of the phase modulation masks can enlarge the depth of field of the optical system.

Accordingly, the pair of the phase modulation masks disclosed in PTL 1 are rotated at 90 degrees, thereby switching states between a state in which the phase modulation is not provided and a state in which the phase modulation is provided, for the light which passes through the pair of the phase modulation masks. This means that the pair of the phase modulation masks can vary the optical-path.

Furthermore, as disclosed in PTL 2, a liquid-crystal varifocal lens is proposed which varies the optical-path using variation in a refractive index of a liquid crystal.

The liquid-crystal varifocal lens is a lens-shaped liquid crystal cell in which liquid crystal molecules are arranged concentrically or radially. An electric field or a magnetic field is applied from an outside to the liquid-crystal varifocal lens to control an arrangement of the liquid-crystal molecules, so that the refractive index of the liquid crystal is continuously varied, thereby varying a focal distance.

As described above, the optical-path can be easily varied by applying a voltage to the liquid-crystal molecules. Therefore, the liquid-crystal varifocal lens is used as the optical-path conversion device.

CITATION LIST

Patent Literature

[PTL 1] Japanese unexamined patent application publication No. 2000-98303
[PTL 2] Japanese unexamined patent application publication No. 61-138922

SUMMARY OF INVENTION

Technical Problem

An imaging apparatus used for a digital still camera, a digital video camera, and the like, is required to switch, at high speed, states between a state in which a depth of field is enlarged and a state in which the depth of field is not enlarged, in view of improvement in usability of the imaging apparatus. In other words, the imaging apparatus is required to switch an optical-path at high speed.

However, according to a method in which a phase modulation mask is moved, as disclosed in PTL 1, the phase modulation mask should be basically moved mechanically by a distance that is approximately more than half the size thereof. The movement takes time, so that it is difficult to achieve the high-speed switching.

In addition, according to the liquid-crystal varifocal lens using variation in a refractive index of the liquid crystal, which is disclosed in PTL 2, a response speed of liquid-crystal molecules is limited by viscosity of a liquid crystal. Therefore, in the liquid-crystal varifocal lens in PTL 2, it is difficult to vary the optical-path at high speed.

Furthermore, a liquid-crystal element has the refractive index which is more dependent on temperature than that of an optical glass is. This causes an adverse result on image-formation performance at a focal position, particularly in a case where the focal distance is varied using the variation of the refractive index of the liquid crystal. Thus, it is difficult to obtain an image having high-resolution by the liquid-crystal varifocal lens disclosed in PTL 2.

In view of the above, an object of the present invention is to provide an optical-path conversion device which can solve the above conventional problems, and an imaging apparatus including the optical-path conversion device. The optical-path conversion device can vary an optical-path at high speed, and obtain an image having high-resolution.

Solution to Problem

In order to achieve the above object, an optical-path conversion device according to an aspect of the present invention includes: a plate-shaped phase modulation mask in which a plurality of phase modulation parts are discretely formed for providing phase modulation to light passing through, and a first light-transmission part is formed for transmitting the light; and a plate-shaped light-shielding member in which a plurality of light-shielding parts are discretely formed for blocking the light, and a second light-transmission part is formed for transmitting the light, in which the phase modulation mask and the light-shielding member overlap each other at least in part, when viewed in an incident direction of the light, and at least one of the phase modulation mask and the light-shielding member is movable in an intersection direction which intersects with the incident direction.

With this configuration, the phase modulation parts are discretely formed in the phase modulation mask, and the light-shielding parts are discretely formed in the light-shielding member. Accordingly, at least one of the phase modulation mask and the light-shielding member is moved in the direction which intersects with the incident direction of the light, thereby changing an overlapping pattern between the phase modulation parts and the light-shielding parts. As a result, an amount of the light which is subjected to the phase modulation can be varied. In other words, the phase modulation mask need not be significantly moved for varying the amount of the light which is subjected to the phase modulation, thereby varying the optical-path at high speed. Furthermore, the refraction index of the phase modulation mask itself need not be varied. Accordingly, a liquid crystal element having the refraction index which significantly depends on a temperature need not be used as the phase modulation mask. With this configuration, an image which has high resolution can be obtained.

An arrangement pattern of the phase modulation parts in the phase modulation mask and an arrangement pattern of the light-shielding parts in the light-shielding member are beneficially identical, and each of the light-shielding parts and each of the phase modulation parts are beneficially identical in shape and size.

With this configuration, the arrangement pattern of the phase modulation parts and the arrangement pattern of the light-shielding parts are identical to each other. To be specific, each one of the phase modulation parts and a corresponding one of the light-shielding parts can overlap each other, thereby preventing unnecessary stray light from being generated. As a result, a beneficial optical property can be obtained.

The phase modulation parts and the first light-transmission part are beneficially arranged alternately in the intersection direction in the phase modulation mask, and the light-shielding parts and the second light-transmission part are beneficially arranged alternately in the intersection direction in the light-shielding member.

With this configuration, at least one of the phase modulation mask and the light-shielding member is moved by a distance between one of the phase modulation parts and the first light-transmission part which are next to each other in the intersection direction, thereby changing the state in which each of the phase modulation parts and the corresponding one of the light-shielding parts overlap each other to the state in which at least one of the phase modulation parts and the second light-transmission part overlap each other. Therefore, the optical-path can be varied with a small amount of the movement. This allows the optical-path to be changed at high speed.

A plurality of first light-transmission parts including the first light-transmission part are beneficially formed in the phase modulation mask, a plurality of second light-transmission parts including the second light-transmission part are beneficially formed in the light-shielding member, the phase modulation parts and the first light-transmission parts are beneficially arranged in a checkerboard design in the phase modulation mask, and the light-shielding parts and the second light-transmission parts are beneficially arranged in the checkerboard design in the light-shielding member.

With this configuration, an aperture ratio of 50% can be achieved. In addition, the phase modulation mask and the light-shielding member can be arranged so that either the light-shielding parts or the second light-transmission part covers the phase modulation parts, when viewed in the incident direction of the light. Accordingly, the optical-path of the light can be varied at high speed, and the image which has the high resolution can be obtained. In addition to the above, a relatively large amount of the light can be allowed to reach the imaging device.

Each of the phase modulation parts beneficially has a curved surface for providing the phase modulation, each of the light-shielding parts is beneficially formed by forming, on a board which transmits the light, a light-shielding film which has a light-shielding property, and a plate surface of the phase modulation mask and a plate surface of the light-shielding member beneficially face each other, the plate surface of the phase modulation mask having the curved surfaces, and the plate surface of the light-shielding member having the light-shielding films formed therein.

With this configuration, a space between the curved surface for providing the phase modulation and the light-shielding film can be reduced. As a result, the unnecessary light which has occurred in the phase modulation mask can be efficiently blocked by the light-shielding film formed in the light-shielding member, thereby obtaining the beneficial optical property.

An imaging apparatus according to an aspect of the present invention includes: the optical-path conversion device described above; and a moving unit configured to move at least one of the light-shielding member and the phase modulation mask in the intersection direction.

The moving unit is beneficially configured to move at least one of the phase modulation mask and the light-shielding member in the intersection direction, thereby changing a state in which each of the phase modulation parts and a corresponding one of the light-shielding parts overlap to a state in which each of the phase modulation parts and the second light-transmission part overlap, when viewed in the incident direction.

With this configuration, the state in which the phase modulation is not provided to the passing light can be changed at high speed to the state in which the phase modulation is provided to the light.

Advantageous Effects of Invention

According to the present invention, a phase modulation mask need not be significantly moved for changing the amount of the light subjected to the phase modulation, thereby varying the optical-path at high speed. Furthermore, a refraction index of the phase modulation mask itself need not be varied, thereby obtaining an image having high resolution.

DESCRIPTION OF EMBODIMENTS

Hereinafter, an embodiment of the present invention is described, referring to drawings.

Embodiment

Figure 1:
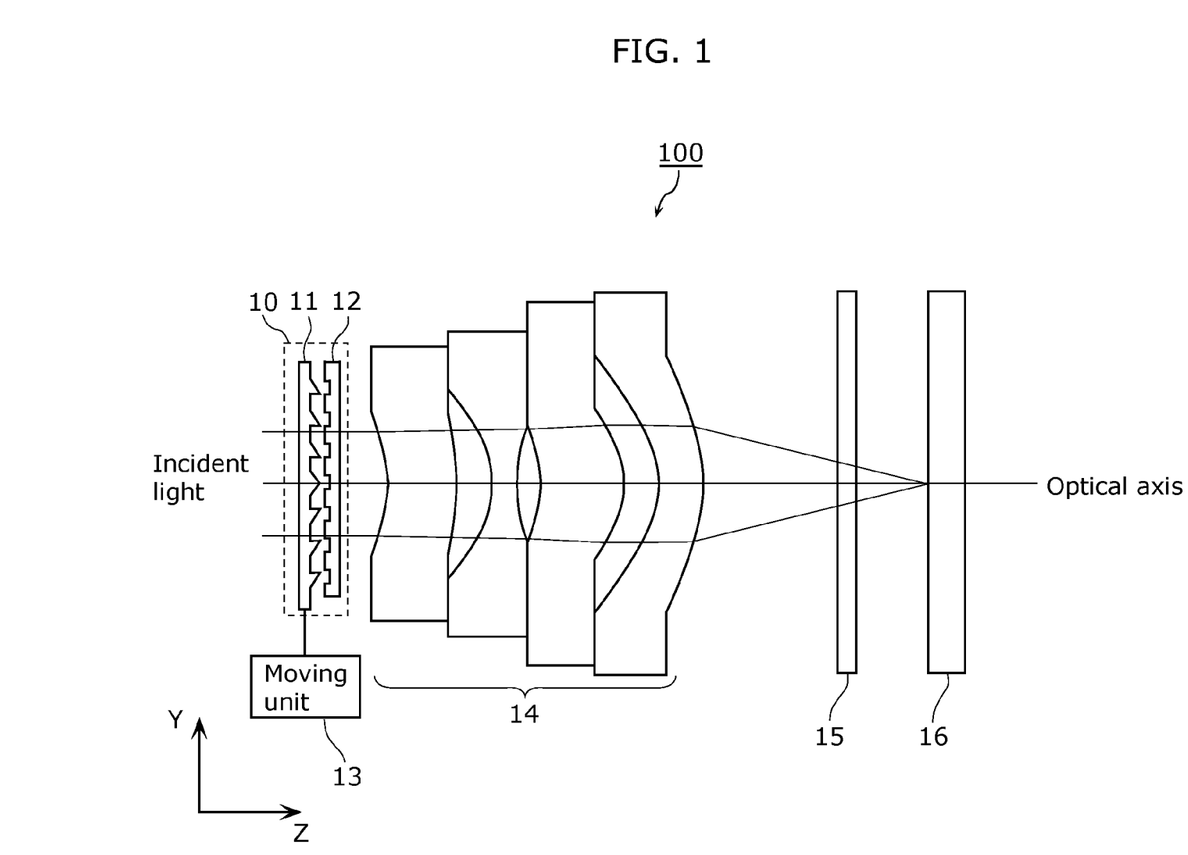
FIG. 1 is a diagram which shows a configuration of an imaging apparatus according to an embodiment of the present invention.

FIG. 1 is a diagram which shows a configuration of an imaging apparatus according to an embodiment of the present invention. In the following diagrams, an X-direction, Y-direction, and Z-direction are perpendicular to one another. The Z-direction is a direction in parallel to an optical axis. In the embodiment, the Z-direction corresponds to an incident direction of light, and the Y-direction corresponds to an intersection direction which interests with the incident direction of the light.

As shown in FIG. 1, an imaging apparatus 100 includes an optical-path conversion device 10, a moving unit 13, an optical lens system 14, a cover glass 15, and an imaging device 16. The optical-path conversion device 10 includes a discrete phase modulation mask 11 and a discrete aperture 12.

The optical-path conversion device 10 serves as a device which can vary an optical-path, and includes the discrete phase modulation mask 11 and the discrete aperture 12.

The discrete phase modulation mask 11 is a plate-shaped phase modulation mask capable of modulating a phase of the light passing through. In the embodiment, the discrete phase modulation mask 11 is provided to be movable in the Y-direction which intersects with the incident direction of the light.

The discrete aperture 12 is a plate-shaped light-shielding member which selectively shields the light between the light which has been subjected to phase modulation by the discrete phase modulation mask 11 and the light which has not been subjected thereto. In the embodiment, the discrete aperture 12 is fixedly provided with respect to the optical axis of the optical lens system 14.

The discrete phase modulation mask 11 and the discrete aperture 12 are arranged so as to overlap each other at least in part, when viewed in the incident direction. Specifically, the discrete phase modulation mask 11 and the discrete aperture 12 overlap each other so as to cover an overall area where the light reaches.

The discrete phase modulation mask 11 and the discrete aperture 12 are described later in detail with reference to FIGS. 2 and 3.

The moving unit 13 moves the discrete aperture 12 to a direction which intersects with the incident direction of the light. Specifically, the moving unit 13 varies a relative position between the discrete phase modulation mask 11 and the discrete aperture 12 for varying the optical-path.

In the embodiment, the moving unit 13 includes a high-speed driving mechanism for parallel moving the discrete phase modulation mask 11 in the Y-direction. To be specific, the moving unit 13 includes a voice coil motor (VCM) or a piezo actuator, as the high-speed driving mechanism.

The VCM is a driving device which moves the discrete phase modulation mask 11 using force generated by applying a current to a coil in a magnetic field, and is used with magnets or coils being arranged to surround the discrete phase modulation mask 11.

The piezo actuator is a driving device which moves the discrete phase modulation mask 11 using displacement occurring by applying a voltage to a piezo element, and can be placed in a relatively unlimited position regardless of a size of the discrete phase modulation mask 11.

The piezo-element is effective, as the moving unit, which is, in comparison with the VCM, smaller and capable of performing higher accuracy driving at higher speed, and is also superior in terms of low power consumption, particularly in a case where a movement distance is relatively short like the present embodiment.

The relative position between the discrete phase modulation mask 11 and the discrete aperture 12 is varied by the moving unit 13, as described above. Accordingly, the optical-path conversion device 10 can switch states between a state where the light which has been subjected to the phase modulation in the discrete phase modulation mask 11 passes through the discrete aperture 12 and a state where the light which has not been subjected to the phase modulation in the discrete phase modulation mask 11 passes through the discrete aperture 12. Therefore, the optical-path conversion device 10 can vary the optical-path.

The optical lens system 14 is an optical lens system for transmitting the light which has passed through the discrete aperture 12. Thus, the optical lens system 14 forms an image on an imaging surface from the light which has passed through the optical-path conversion device 10. Although the optical lens system 14 includes a plurality of lenses in the embodiment, the optical lens system 14 may include only one lens.

The cover glass 15 is a member for protecting an imaging surface of the imaging device 16, and covers the imaging surface of the imaging device 16. It should be noted that the cover glass 15 need not be necessarily placed. In other words, the imaging apparatus 100 may include the cover glass 15, according to the needs in design.

The imaging device 16 is a solid-state imaging device, such as a charge coupled device (CCD) image sensor or a complementary metal oxide semiconductor (CMOS) image sensor. The imaging device 16 converts, to an electric signal, the light reaching the imaging surface via the optical-path conversion device 10, the optical lens system 14, and the cover glass 15.

As described above, the discrete phase modulation mask 11, the discrete aperture 12, the optical lens system 14, the cover glass 15, and the imaging device 16 are arranged in the respective predetermined positions. The light reaching the discrete phase modulation mask 11 passes through the discrete aperture 12, the optical lens system 14, and the cover glass 15, and forms an image on the imaging surface of the imaging device 16.

Although the discrete phase modulation mask 11 is provided ahead of the discrete aperture 12 in the incident direction of the light in FIG. 1, the discrete aperture 12 may be provided ahead of the discrete phase modulation mask 11.

Furthermore, although the discrete aperture 12 is provided ahead of the optical lens system 14 in FIG. 1, the discrete aperture 12 need not be provided ahead of the optical lens system 14. The discrete aperture 12 may be provided in a central area in the optical lens system, depending on an optical specification to be used.

The light passing through the discrete phase modulation mask 11 may be, for example, as parallel light as possible for effectively being shielded by the discrete aperture 12.

In FIG. 1, the discrete phase modulation mask 11 and the discrete aperture 12 are arranged to have a space therebetween. The space may be, for example, as small and uniform as possible.

The plate surface of the discrete phase modulation mask 11 and the plate surface of the discrete aperture 12 may face each other so as to allow a surface of the discrete phase modulation mask 11, which provides the phase modulation, and a surface of the discrete aperture 12, in which a light-shielding film is formed, to be face each other. In other words, the discrete phase modulation mask 11 and the discrete aperture 12 may be arranged, for example, in such a manner that the plate surface in which a curved-surface for providing the phase modulation is formed and the plate surface in which the light-shielding film is formed face each other.

Accordingly, in the optical-path conversion device 10, a space can be reduced between the curved surface for providing the phase modulation and the light-shielding film. As a result, the optical-path conversion device 10 can effectively block unnecessary light generated in the discrete phase modulation mask 11, by the light-shielding film of the discrete aperture 12, thereby obtaining a beneficial optical property. If they separate extremely far away from each other, the unnecessary light undesirably passes through the discrete aperture 12 and reaches the imaging surface of the imaging device 16.

Figure 2:
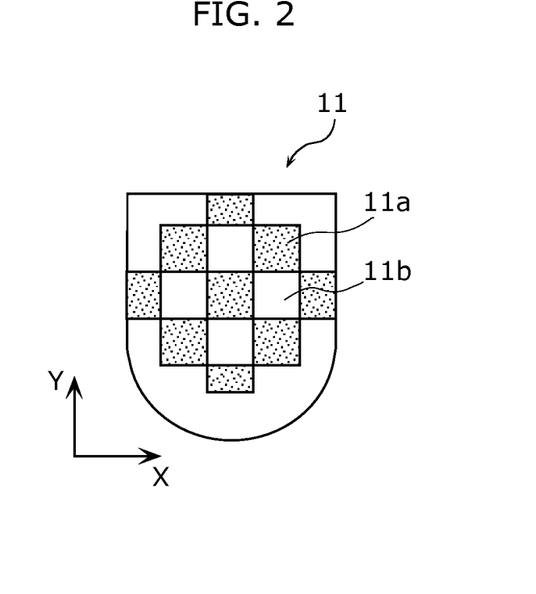
FIG. 2 is a diagram which shows a discrete phase modulation mask according to the embodiment of the present invention.

The discrete phase modulation mask 11 is described in detail, referring to FIG. 2.

FIG. 2 is a diagram which shows the discrete phase modulation mask according to the embodiment of the present invention. Specifically, FIG. 2 is a plane view of the discrete phase modulation mask 11. FIG. 1 shows a cross sectional view of the discrete phase modulation mask 11.

As shown in FIG. 2, in the discrete phase modulation mask 11, a plurality of phase modulation parts 11a are discretely formed. Also in the discrete phase modulation mask 11, light-transmission parts 11b which transmit the light are formed in areas where the phase modulation parts 11a are not formed. In the embodiment, the phase modulation parts 11a and the light-transmission parts 11b are alternately arranged in the intersection direction which intersects with the incident direction of the light.

Specifically, in the embodiment, the phase modulation parts 11a and the light-transmission parts 11b are arranged in a checkerboard design. In other words, the phase modulation parts 11a and the light-transmission parts 11b are alternately arranged in two directions which are orthogonal to each other (the X-direction and the Y-direction). Each of the light-shielding parts 11a and each of the light-transmission parts 11b have a same size, and are formed in a square shape.

The discrete phase modulation mask 11 is provided to be movable in the intersection direction (the Y-direction) which intersects with the incident direction of the light. Thus, the discrete phase modulation mask 11 is moved in the Y-direction by the moving unit 13.

The phase modulation parts 11a provide the phase modulation to the light passing through. To be specific, each of the phase modulation parts 11a includes one surface formed in a curved shape for providing the phase modulation and the other surface formed in a planer shape.

To be more specific, each of the phase modulation parts 11a includes one surface in which the curved surface satisfying $z=k(x^3+y^3)$ is formed. Here, k is a constant. It should be noted that a position of the optical axis is expressed by $(x, y)=(0, 0)$.

Such a curved surface is formed in one of the surfaces of each of the phase modulation parts 11a, enabling the phase modulation parts 11a to provide the phase modulation to the light passing through. As a result, the optical-path conversion device 10 can enlarge the depth of field.

Each of the light-transmission parts 11b corresponds to a first light-transmission part, and transmits the light. In other words, the light-transmission parts 11b do not provide the phase modulation to the light passing through. Each of the light-transmission parts 11b has two surfaces which are parallel to each other.

Such a discrete phase modulation mask 11 can be made by substituting a part of a curved surface formed in a cubic phase-modulation mask with a planer surface. The discrete phase modulation mask 11 can also be made by separating the curved surface formed in the cubic phase-modulation mask.

It should be noted that the curved surface formed in each of the phase modulation parts 11a need not be shaped in the curved surface like the above. The curved surface may have, for example, a spherical-lens shape, aspheric-lens shape, Fresnel-lens shape, or a shape based on a polynomial function different from any one of the functions for the above shapes.

Specifically, the curved surface formed in each of the phase modulation parts 11a may be a curved surface based on a quartic function. To be specific, the curved surface formed in each of the phase modulation parts 11a may be a curved surface formed in a quartic phase mask (QPM). Furthermore, the curved surface formed in each of the phase modulation parts 11a may be formed in a shape of a lens used for enlarging the depth of field in a usual optical lens system. In the above cases, the phase modulation parts 11a can also provide the phase modulation to the light passing through. Accordingly, the optical-path conversion device 10 can enlarge the depth of field.

It should be noted that the optical-path conversion device 10 need not be able to enlarge the depth of field. In other words, the optical-path conversion device 10 may at least be able to vary the optical-path. Specifically, the optical-path conversion device 10 may be able to vary a focal distance by varying the optical-path.

The discrete phase modulation mask 11 is made of an optical glass material or a resin material. As the optical glass material, a transparent glass material, such as BK7, FD60, B270, quarts, or the like may be used, for example. As the resin material, a cyclo olefin polymer resin having a small coefficient of thermal expansion may be used, for example.

The discrete phase modulation mask 11 is manufactured by cutting or molding the optical glass material or the resin material, for example. It is beneficial that the discrete phase modulation mask 11 is manufactured by molding rather than by cutting, in view of mass-productivity.

Figure 3:
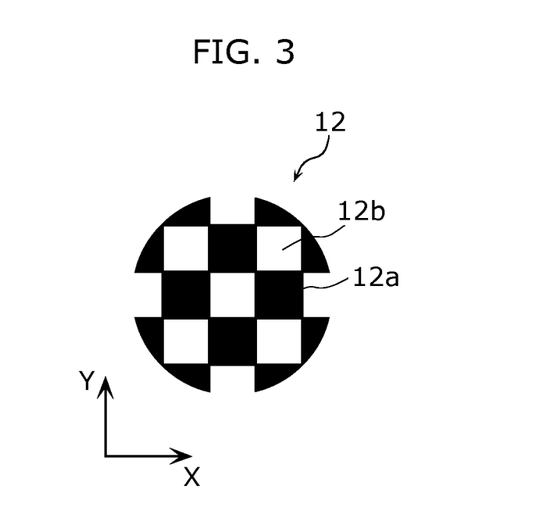
FIG. 3 is a diagram which shows a discrete aperture according to the embodiment of the present invention.

Next, the discrete aperture 12 is described in detail, referring to FIG. 3.

FIG. 3 is a diagram which shows a discrete aperture according to the embodiment of the present invention. FIG. 3 is a plane view of the discrete aperture 12.

As shown in FIG. 3, in the discrete aperture 12, a plurality of light-shielding parts 12a which block the light are discretely formed. In the discrete phase aperture 12, light-transmission parts 12b which transmit the light are formed in areas where the light-shielding parts 12a are not formed. The light-transmission parts 12b correspond to a second light-transmission part. In the embodiment, the light-shielding parts 12a and the light-transmission parts 12b are alternately arranged in the intersection direction which intersects with the incident direction of the light.

Specifically, in the embodiment, the light-shielding parts 12a and the light-transmission parts 12b are arranged in the checkerboard design. In other words, the light-shielding parts 12a and the light-transmission parts 12b are alternately arranged in two directions which are orthogonal to each other (the X-direction and the Y-direction). Each of the light-shielding parts 12a and each of the light-transmission parts 12b have a same size, and are formed in a square shape.

As is clear from the above, an arrangement pattern of the phase modulation parts 11a in the discrete phase modulation mask 11 and an arrangement pattern of the light-shielding parts 12a in the discrete aperture 12 are identical to each other.

A method for manufacturing the discrete aperture 12 is described below.

The discrete aperture 12 is manufactured by discretely forming a plurality of light-shielding films on a transparent board, for example. In this case, an area where the light-shielding film is formed corresponds to each of the light-shielding parts 12a and an area where the light-shielding film is not formed corresponds to each of the light-transmission parts 12b.

As a board material for the discrete aperture 12, the optical glass or the resin film is used, for example. As the optical glass, the transparent glass material, such as BK7, FD60, B270, quartz, or the like may be used, for example.

The light-shielding film to be formed on the optical glass is manufactured using a sputtering technique, an electron beam deposition technique, a spin-coating technique, or the like. As a material for the light-shielding film, used is a metallic material including chrome, tungsten, titanium, or the like, or a light-shielding resin material obtained by dispersing black pigment in a resin.

The light-shielding film having an appropriate film thickness is manufactured, thereby manufacturing a light-shielding film blocking light which is to pass through the film and has a small amount of reflection light from the light-shielding film.

A pattern of the light shielding film can be formed by known techniques including a lithography technique, an electron beam drawing technique, a mask deposition technique, or the like.

The manufacturing method for the discrete aperture 12 need not be limited to the above. For example, the discrete aperture 12 may also be manufactured by forming a through-hole on a board having a light-shielding effect. In this case, an area where the through-hole is not formed corresponds to each of the light-shielding parts 12a, while an area where the through-hole is formed corresponds to each of the light-transmission parts 12b.

Figure 4:
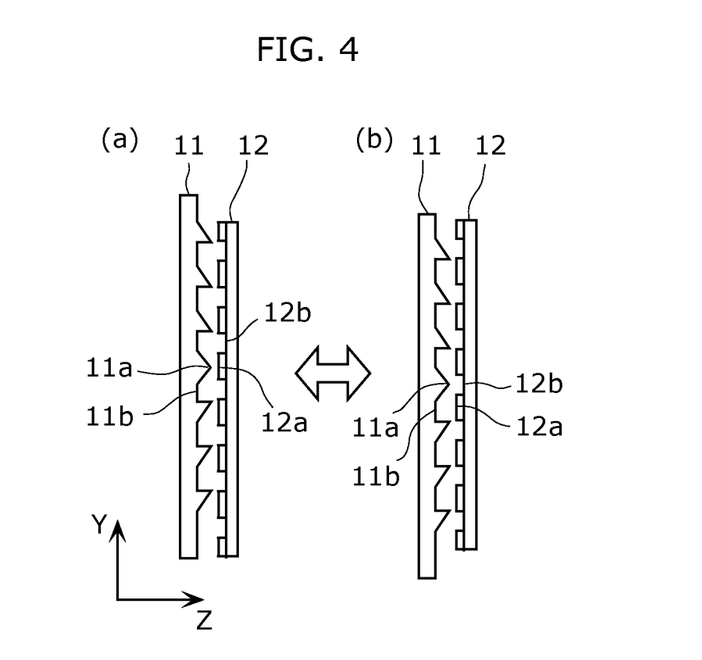
FIG. 4 is a diagram for describing operation of an optical-path conversion device according to the embodiment of the present invention.

Next, various operations of the optical-path conversion device 10 configured as above is described, referring to FIG. 4.

FIG. 4 is a diagram for describing the operation of the optical-path conversion device according to the embodiment of the present invention. FIG. 4(a) shows a state in which the light passing through the optical-path conversion device 10 is not subjected to the phase modulation. Meanwhile, FIG. 4(b) shows a state in which the light passing through the optical-path conversion device 10 is subjected to the phase modulation.

In FIG. 4(a), the discrete phase modulation mask 11 and the discrete aperture 12 are arranged in a specific position relation. To be specific, the discrete phase modulation mask 11 and the discrete aperture 12 are arranged in such a manner that the light-transmission parts 11b in the discrete phase modulation mask 11 and the light-transmission parts 12b in the discrete aperture 12 overlap each other, when viewed in the incident direction of the light. With this configuration, the light which passes through the light-transmission parts 11b and is not subjected to the phase modulation passes through the discrete aperture 12 and reaches the optical lens system 14.

In FIG. 4(a), the discrete phase modulation mask 11 and the discrete aperture 12 are arranged in such a manner that each of the phase modulation parts 11a in the discrete phase modulation mask 11 and a corresponding one of the light-shielding parts 12a in the discrete aperture 12 overlap each other, when viewed in the incident direction of the light. With this configuration, the light which passes through the phase modulation parts 11a and is subjected to the phase modulation is blocked by the light-shielding parts 12a, and thus does not reach the optical lens system 14.

In the state as shown in FIG. 4(a), only the light which has not been subjected to the phase modulation passes through the discrete aperture 12 among light which has passed the discrete phase modulation mask 11. Accordingly, the phase modulation is not provided to the light which has passed through the optical-path conversion device 10.

In this situation, the moving unit 13 moves the discrete phase modulation mask 11 in the Y-direction by a distance between a center of one of the phase modulation parts 11a and a center of one of the light-transmission parts 11b, in which the one of the phase modulation parts 11a and the one of the light-transmission parts 11b are next to each other, so that a state shown in FIG. 4(b) is obtained.

In FIG. 4(b), the discrete phase modulation mask 11 and the discrete aperture 12 are arranged in such a manner that the phase modulation parts 11a in the discrete phase modulation mask 11 and the light-transmission parts 12b in the discrete aperture 12 overlap each other. With this configuration, the light which passes through the phase modulation parts 11a and is subjected to the phase modulation passes through the discrete aperture 12, and then reaches the optical lens system 14.

In FIG. 4(b), the discrete phase modulation mask 11 and the discrete aperture 12 are arranged in such a manner that the light-transmission parts 11b in the discrete phase modulation mask 11 and the light-shielding parts 12a in the discrete aperture 12 overlap each other, when viewed in the incident direction of the light. With this configuration, the light which has passed the light-transmission parts 11b and is not subjected to the phase modulation is blocked by the light-shielding parts 12a, and thus does not reach the optical lens system 14.

Accordingly, in the state shown in FIG. 4(b), only the light which is subjected to the phase modulation passes through the discrete aperture 12, among light which has passed through the discrete phase modulation mask 11. Thus, the phase modulation is provided to the light which has passed through the optical-path conversion device 10.

As described above, the light which has been subjected to the phase modulation forms an image on the imaging surface of the imaging device 16 via the optical lens system 14 and the cover glass 15. At this time, an effect of the phase modulation is expressed, so that the depth of field is enlarged.

As described above, the moving unit 13 moves the discrete phase modulation mask 11 in the direction which intersects with the incident direction of the light so that the state in which the phase modulation parts 11a and the light-shielding parts 12a overlap each other (FIG. 4(a)) is changed to the state in which the phase modulation parts 11a and the light-transmission parts 12b overlap each other (FIG. 4(b)). As a result, the moving unit 13 can change the states at high speed from the state in which the phase modulation is not provided to the state in which the phase modulation is provided.

Here, it is beneficial that the discrete aperture 12 covers all of the areas in the discrete phase modulation mask 11, through which the light passes, in the states shown in FIG. 4(a) and FIG. 4(b). With this configuration, the unnecessary stray light can be prevented from being generated in the light which passes through the discrete phase modulation mask 11 and the discrete aperture 12.

Next, an effect of the optical-path conversion device according to the embodiment is described, referring to FIGS. 5A, 5B, 6A, and 6B.

Figure 5A:
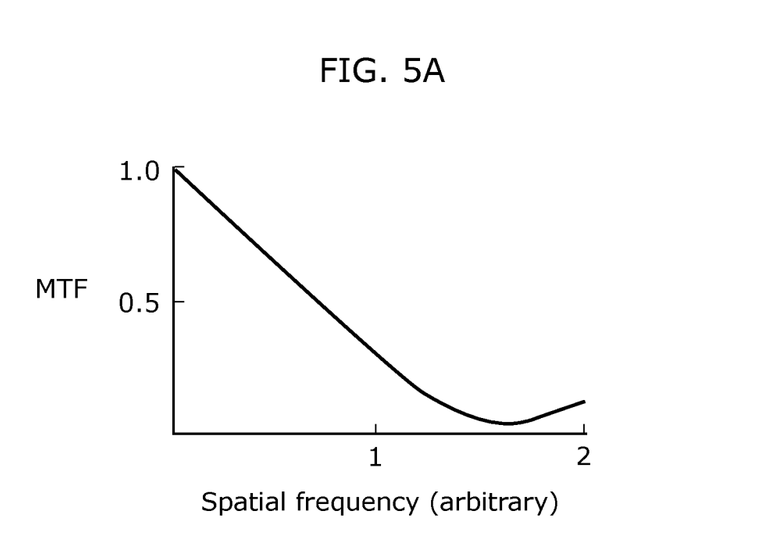
FIG. 5A is a graph which shows modulation transfer function (MTF) characteristics before the optical-path conversion device according to the embodiment of the present invention varies an optical-path.
Figure 5B:
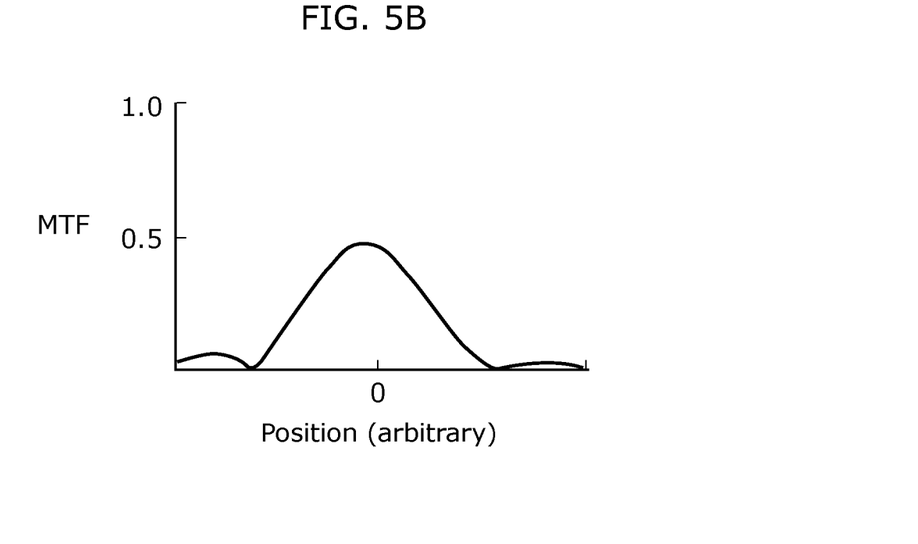
FIG. 5B is a graph which shows defocus characteristics before the optical-path conversion device according to the embodiment of the present invention varies the optical-path.

FIG. 5A is a graph which shows modulation transfer function (MTF) characteristics before the optical-path conversion device according to the embodiment of the present invention varies the optical-path. FIG. 5B is a graph which shows defocus characteristics before the optical-path conversion device according to the embodiment of the present invention varies the optical-path. Thus, FIGS. 5A and 5B show optical characteristics in the state which is shown in FIG. 4(a).

In FIG. 5A, the vertical axis indicates the MTF which represents a level of resolution, while the horizontal axis indicates a spatial frequency. FIG. 5A shows that a degree of decrease in the MTF is relatively low when the spatial frequency increases. Accordingly, a relatively beneficial resolution property can also be obtained by using the optical-path conversion device 10.

In FIG. 5B, the vertical axis indicates the MTF, while the horizontal axis indicates a distance from a focal position. FIG. 5B shows that though the beneficial resolution property is obtained at around the focal position, the resolution property precipitously deteriorates as a subject position moves farther away from the focal position.

Figure 6A:
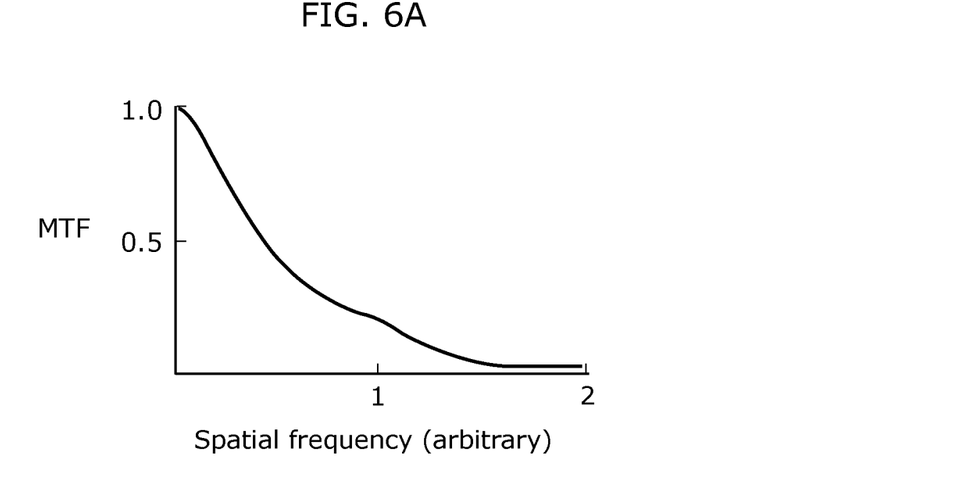
FIG. 6A is a graph which shows the MTF characteristics after the optical-path conversion device according to the embodiment of the present invention varies the optical-path.
Figure 6B:
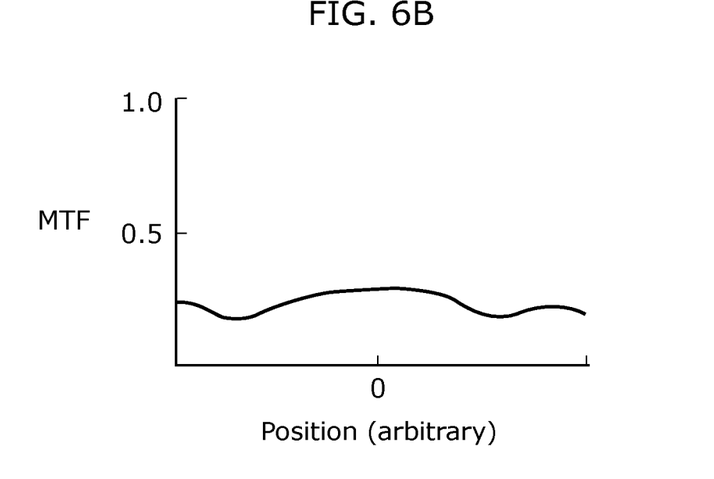
FIG. 6B is a graph which shows the defocus characteristics after the optical-path conversion device according to the embodiment of the present invention varies the optical-path.

FIG. 6A is a graph which shows the MTF characteristics after the optical-path conversion device according to the embodiment of the present invention varies the optical-path. FIG. 6B is a graph which shows the defocus characteristics after the optical-path conversion device according to the embodiment of the present invention varies the optical-path. Thus, FIGS. 6A and 6B show the optical characteristic in the state shown in FIG. 4(b).

FIG. 6A shows that the degree of decrease in the MTF, when the spatial frequency increases, is not so different from the case shown in FIG. 5A. This means that, in the case shown in FIG. 6A, a relatively beneficial resolution property can be obtained as in the case shown in FIG. 5A.

In addition, FIG. 6B shows that the MTF does not significantly vary in relation to the distance from the focal position. This clearly shows that the depth of field is enlarged by the optical-path conversion device 10. This is very different from the case shown in FIG. 5B.

Thus, the optical-path conversion device 10 according to the embodiment can enlarge the depth of field, while obtaining the relatively beneficial resolution property.

As described above, in the optical-path conversion device 10 according to the embodiment, a plurality of phase modulation parts 11a are discretely formed in the discrete phase modulation mask 11, and a plurality of light-shielding parts 12a are discretely formed in the discrete aperture 12. Therefore, the discrete phase modulation mask 11 is moved in the direction which intersects with the incident direction of the light, thereby varying an overlapping pattern between the phase modulation parts 11a and the light-shielding parts 12a. This can vary an amount of the light which is subjected to the phase modulation.

In other words, the optical-path conversion device 10 need not significantly move the discrete phase modulation mask 11, in order to vary the amount of the light which is subjected to the phase modulation. Therefore, the optical-path conversion device 10 can vary the optical-path at high speed. Furthermore, in the optical-path conversion device 10, the refraction index of the discrete phase modulation mask 11 itself need not be varied. Accordingly, a liquid crystal element having a refraction index which is greatly dependent on a temperature need not be used as the phase modulation mask. Therefore, an image having high resolution can be obtained using the optical-path conversion device 10.

Furthermore, in the optical-path conversion device 10 according to the embodiment, the arrangement pattern of the phase modulation parts 11a and the arrangement pattern of the light-shielding parts 12a are identical to each other. To be specific, in the optical-path conversion element 10, each of the phase modulation parts 11a and a corresponding one of the light-shielding parts 12a can overlap, thereby preventing the unnecessary stray light from being generated. Therefore, the beneficial optical characteristics can be obtained.

Furthermore, in the optical-path conversion device 10 according to the embodiment, the discrete phase modulation mask 11 is moved by a distance between the center of one of the phase modulation parts 11a and the center of one of the light-transmission parts 11b, in which the one of the phase modulation parts 11a and the one of the light-transmission parts 11b are next to each other, so that the state in which the phase modulation parts 11a and the light-shielding parts 12a overlap can be changed to the state in which the phase modulation parts 11a and the light-transmission parts 12b overlap. Therefore, the optical-path can be varied with a small amount of the movement of the discrete phase modulation mask 11. This allows the optical-path to be varied at high speed.

For enabling the amount of the light which reaches the imaging device 16 to increase, an opening ratio of the discrete aperture 12 may be, for example, as large as possible. The light-shielding parts 12a and the light-transmission parts 12b are arranged in the checkerboard design in the discrete aperture 12, as described in the embodiment, thereby enabling the discrete aperture 12 to achieve 50% of the opening ratio. Furthermore, in the optical-path conversion device 10, the discrete phase modulation mask 11 and the discrete aperture 12 can be arranged so that either the light-shielding parts 12a or the light-transmission parts 12b cover the phase modulation parts 11a. Thus, the optical-path conversion device 10 can change the optical-path of the light at high speed, and obtain an image having the high resolution. In addition, the optical-path conversion unit 10 allows a relatively large amount of the light to reach the imaging device.

As described above, in the optical-path conversion device 10 according to the embodiment, the states can be easily switched between the state in which the phase modulation is not provided to the light and the state in which the phase modulation is provided to the light, at least by slightly moving the discrete phase modulation mask 11 by the distance between one of the phase modulation parts 11a and one of the light-transmission parts 11b, without significantly rotating the board itself of the phase modulation mask, unlike a conventional phase modulation mask. Therefore, the optical-path conversion device 10 can vary the optical-path at higher speed than that in a conventional technique.

Although the optical-path conversion device according to an aspect of the present invention and the imaging apparatus including the optical-path conversion device are described based on the embodiment, the present invention is not limited to the embodiment. All possible variations which include modifications added to the embodiment by a person skilled in the art in his/her conceivable range are involved in the present invention as long as the variations do not depart from principles of the present invention.

For example, though the moving unit 13 moves the discrete phase modulation mask 11 in the embodiment, the moving unit 13 may move the discrete aperture 12. In other words, the moving unit 13 at least may change a relative position relationship between the discrete phase modulation mask 11 and the discrete aperture 12, when viewed in the incident direction of the light.

Furthermore, though in the discrete phase modulation mask 11, the phase modulation parts 11a and the light-transmission parts 11b are arranged in the checkerboard design, they need not be arranged in the checkerboard design. Accordingly, each of the phase modulation parts 11a and each of the light-transmission parts 11b need not be in a square shape. In addition, in the discrete phase modulation mask 11, the phase modulation parts 11a and the light-transmission part 11b need not be arranged alternately. The arrangement pattern of the phase modulation parts 11a in the discrete phase modulation mask 11 and the arrangement pattern of the light-shielding parts 12a in the discrete aperture 12 need not be identical to each other.

Even in such a case, the overlapping pattern between the phase modulation parts 11a and the light-shielding parts 12a may be at least changed in the optical-path conversion device 10, when the optical-path of the light is changed. Therefore, the moving unit 13 need not move the discrete phase modulation mask 11 significantly. Accordingly, if the optical-path conversion device 10 is employed, the imaging apparatus 100 can change the optical-path at high speed.

Although, in the aforementioned embodiment, the moving unit 13 moves the discrete phase modulation mask 11 by the amount of the distance between the center of one of the phase modulation parts 11a and the center of one of the light-transmission parts 11b, in which the one of the phase modulation parts 11a and the one of the light-transmission parts 11b are next to each other, the distance need not be the distance between the centers. For example, the moving unit 13 may move the discrete phase modulation mask 11 by a distance which is twice or three times of the distance between the centers.

The discrete phase modulation mask 11 and the shape thereof, which are described in the aforementioned embodiment, are an example. The discrete phase modulation mask 11 may be formed in a polygon shape, such as a quadrangular or a hexagonal shape, for example.

INDUSTRIAL APPLICABILITY

An optical-path conversion device according to the present invention is usable to a digital still camera, digital video camera, or the like.

REFERENCE SIGNS LIST

10 Optical-path conversion device
11 Discrete phase modulation mask
11a Phase modulation part
11b, 12b Light-transmission part
12 Discrete aperture
12a Light-shielding part
13 Moving unit
14 Optical lens system
15 Cover glass
16 Imaging device
100 Imaging apparatus

The invention claimed is:

1. An optical-path conversion device comprising:
a plate-shaped phase modulation mask in which a plurality of phase modulation parts are discretely formed for providing phase modulation to light passing through, and a first light-transmission part is formed for transmitting the light; and
a plate-shaped light-shielding member in which a plurality of light-shielding parts are discretely formed for blocking the light, and a second light-transmission part is formed for transmitting the light,
wherein the phase modulation mask and the light-shielding member overlap each other at least in part, when viewed in an incident direction of the light,
at least one of the phase modulation mask and the light-shielding member is movable in an intersection direction which intersects with the incident direction,
each of the phase modulation parts has a curved surface for providing the phase modulation,
each of the light-shielding parts is formed by forming, on a board which transmits the light, a light-shielding film which has a light-shielding property, and
a plate surface of the phase modulation mask and a plate surface of the light-shielding member face each other, the plate surface of the phase modulation mask having the curved surfaces, and the plate surface of the light-shielding member having the light-shielding films formed therein.

2. The optical-path conversion device according to claim 1, wherein an arrangement pattern of the phase modulation parts in the phase modulation mask and an arrangement pattern of the light-shielding parts in the light-shielding member are identical, and
each of the light-shielding parts and each of the phase modulation parts are identical in shape and size.

3. The optical-path conversion device according to claim 2, wherein the phase modulation parts and the first light-transmission part are arranged alternately in the intersection direction in the phase modulation mask, and
the light-shielding parts and the second light-transmission part are arranged alternately in the intersection direction in the light-shielding member.

4. The optical-path conversion device according to claim 3, wherein a plurality of first light-transmission parts including the first light-transmission part are formed in the phase modulation mask,
a plurality of second light-transmission parts including the second light-transmission part are formed in the light-shielding member,
the phase modulation parts and the first light-transmission parts are arranged in a checkerboard design in the phase modulation mask, and
the light-shielding parts and the second light-transmission parts are arranged in the checkerboard design in the light-shielding member.

5. An imaging apparatus comprising:
the optical-path conversion device according to claim 1; and
a moving unit configured to move at least one of the light-shielding member and the phase modulation mask in the intersection direction.

6. The imaging apparatus according to claim 5,
wherein the moving unit is configured to move at least one of the phase modulation mask and the light-shielding member in the intersection direction, thereby changing a state in which each of the phase modulation parts and a corresponding one of the light-shielding parts overlap to a state in which each of the phase modulation parts and the second light-transmission part overlap, when viewed in the incident direction.

* * * * *